US012651831B2

(12) United States Patent
Zhang et al.

(10) Patent No.: US 12,651,831 B2
(45) Date of Patent: Jun. 9, 2026

(54) FLEXIBLE PRINTED CIRCUIT BOARD WITH NEAR-FIELD COMMUNICATION (NFC) COIL INTEGRATION

(71) Applicant: Meta Platforms Technologies, LLC, Menlo Park, CA (US)

(72) Inventors: Weihong Melissa Zhang, Long Grove, IL (US); Chilin Hsu, San Jose, CA (US); Dong Chen, Kirkland, WA (US); Kyung Won Park, Bellevue, WA (US); Xiangyu Kong, Sunnyvale, CA (US); Kevin Lo, Belmont, CA (US); Brooks Bernard Hallin, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 338 days.

(21) Appl. No.: 17/732,180

(22) Filed: Apr. 28, 2022

(65) Prior Publication Data

US 2023/0352823 A1    Nov. 2, 2023

(51) Int. Cl.
| | |
|---|---|
| *H01Q 1/38* | (2006.01) |
| *H01Q 1/44* | (2006.01) |
| *H01Q 7/00* | (2006.01) |
| *H04B 5/26* | (2024.01) |

(52) U.S. Cl.
CPC ................. *H01Q 1/38* (2013.01); *H01Q 1/44* (2013.01); *H01Q 7/00* (2013.01); *H04B 5/26* (2024.01)

(58) Field of Classification Search
CPC ... H01Q 1/38; H01Q 1/44; H01Q 7/00; H04B 5/26
See application file for complete search history.

(56) References Cited

U.S. PATENT DOCUMENTS

| | | | | |
|---|---|---|---|---|
| 10,349,518 B1 * | 7/2019 | Huang | ..................... | H05K 1/05 |
| 2010/0032820 A1 * | 2/2010 | Bruennert | ........... | H01L 25/0657 |
| | | | | 257/784 |
| 2012/0015556 A1 * | 1/2012 | Saraswat | ............ | H01R 13/6587 |
| | | | | 439/620.09 |
| 2012/0086556 A1 * | 4/2012 | Ikemoto | ........... | G06K 19/07779 |
| | | | | 235/492 |
| 2012/0135681 A1 * | 5/2012 | Adams | ................... | H04W 88/06 |
| | | | | 455/41.1 |

(Continued)

FOREIGN PATENT DOCUMENTS

| | | | | |
|---|---|---|---|---|
| KR | 101407205 B1 * | 6/2014 | ............. | H02J 50/12 |

OTHER PUBLICATIONS

International Search Report and Written Opinion for International Application No. PCT/US2023/019519, mailed Aug. 10, 2023, 11 pages.

*Primary Examiner* — Raymond S Dean
(74) *Attorney, Agent, or Firm* — Greenberg Traurig, LLP

(57) ABSTRACT

A flexible printed circuit board includes a coil for near-field communication (NFC) and circuit components for performing other functions such as driving a display panel. By integrating the NFC coil into the flexible printed circuit board, the number of components in an electronic device may be reduced. A ferrite sheet is provided below the NFC coil to enhance the performance of NFC signal reception and transmission. A conductive layer is provided below the ferrite sheet to prevent interference with circuits on a printed circuit board below the flexible printed circuit board.

19 Claims, 3 Drawing Sheets

(56)                    References Cited

U.S. PATENT DOCUMENTS

| | | | |
|---|---|---|---|
| 2015/0235121 A1* | 8/2015 | Pavate | G06K 19/07783 |
| | | | 235/492 |
| 2016/0148752 A1* | 5/2016 | Moon | H01Q 1/2208 |
| | | | 343/867 |
| 2016/0344444 A1* | 11/2016 | Yang | H04M 1/0277 |
| 2016/0349789 A1* | 12/2016 | Lee | H04B 5/43 |
| 2017/0047636 A1* | 2/2017 | Lee | H01Q 5/321 |
| 2017/0220074 A1* | 8/2017 | Cooper | H05K 9/0032 |
| 2018/0069299 A1* | 3/2018 | Kang | H01Q 1/243 |
| 2018/0287281 A1* | 10/2018 | Viloteau | H01R 12/585 |
| 2018/0301790 A1 | 10/2018 | Kim et al. | |
| 2019/0097278 A1 | 3/2019 | Park et al. | |
| 2020/0136237 A1* | 4/2020 | Kang | H01Q 5/35 |
| 2020/0312256 A1* | 10/2020 | Lin | G09G 3/3607 |
| 2020/0313284 A1 | 10/2020 | Kim et al. | |
| 2021/0185843 A1 | 6/2021 | Lee et al. | |

* cited by examiner

FLEXIBLE PRINTED CIRCUIT BOARD WITH NEAR-FIELD COMMUNICATION (NFC) COIL INTEGRATION

BACKGROUND

This disclosure relates to a printed circuit board with a coil for wireless communication, and specifically to a flexible printed circuit board integrating a coil for near-field communication and other circuit components.

Portable electronic devices often use near-field communication (NFC) to communicate with other electronic devices. The NFC typically is operable over a short distance and is gaining popularity in various applications, including contactless payment systems, social networking (e.g., sharing contacts and text messages) and electronic identify and access tokens used in access badges and public transport. The NFC communication may be incorporated into the portable electronic devices to expand their usage and replace individual cards or access badges. To implement the NFC communication in the portable electronic devices, coils for receiving or sending wireless NFC data are required. Such coils are embedded into a separate substrate, which tends to increase the number of components and the size of the portable electronic devices.

SUMMARY

Embodiments relate to a flexible printed circuit board (FPCB) in an electronic device that includes a conductive coil in a first region, and one or more circuit components in a second region. The conductive coil receives or sends data via near-field communication (NFC) through a first surface of the FPCB. The circuit components operate in conjunction with other circuit components in a separate printed circuit board to perform a function of the electronic device.

BRIEF DESCRIPTION OF DRAWINGS

Figure (FIG. 1 is a diagram of a portable electronic device, according to some embodiments.

The figures depict embodiments of the present disclosure for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
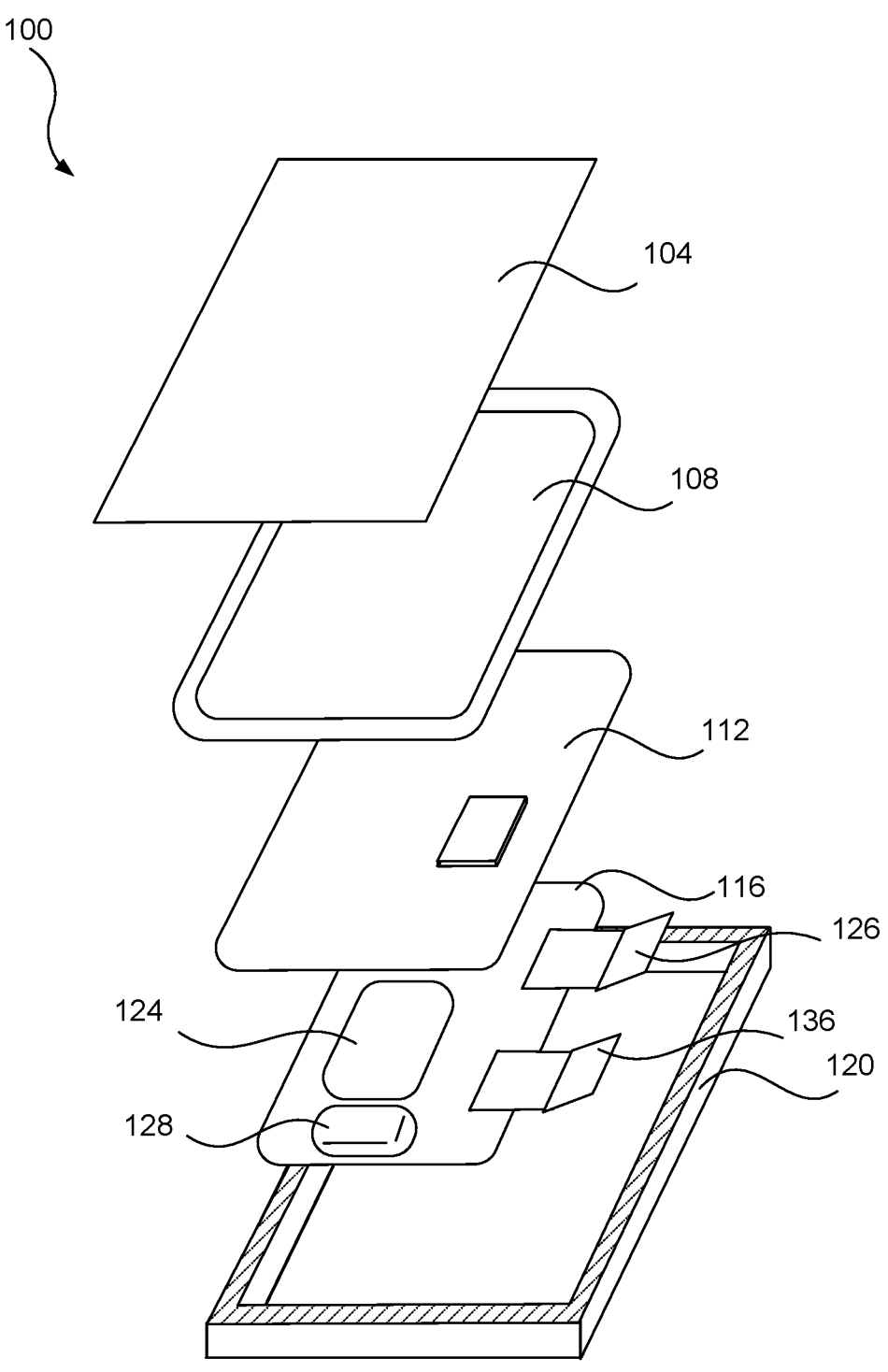

FIG. 1 is a diagram of a portable electronic device 100, in accordance with some embodiments. The portable electronic device 100 may be used to present various information to the user, interact with the user, and also to communicate with other electronic devices. The electronic device 100 may be embodies as, but is not limited to, a smartphone, a smart watch, a game console, a personal digital assistant, and a head-mounted display.

The electronic device 100 shown in FIG. 1 may include, among other components, a cover glass 104, a display assembly 108, a FPCB 112, a main printed circuit board 116, and a frame 120. The frame 120 and the cover glass 104 encloses other components within. In one or more embodiments, the frame 120 may include structures that function as an antenna for long range wireless communication such as WiFi or cellular communication. A coil for NFC communication is separate from the antenna and is provided in the FPCB 112.

The display assembly 108 may include a display panel and a printed circuit board with a display driver integrated circuit (DDIC). The display panel may embody various display technology including, but not limited to, liquid crystal display (LCD), organic light emitting diodes (OLED), and micro LEDs. The DDIC receives image data, and generates data signals and timing signals for displaying images on the display panel. In one or more embodiments, the display panel may communicate with the main printed circuit board 116 via a connector 126 to receive the data signals and other control signals.

The FPCB 112 integrates the NFC coil and also includes circuit components to reduce the number of printed circuit boards in the electronic device 100. The circuit components in the FPCB 112 may operate in conjunction with circuit components in other printed circuit boards. The details of the FPCB 112 are described below with reference to FIGS. 3A and 3B. The FPCB 112 may include one or more sockets (e.g., socket 212) for receiving terminals of connectors (e.g., connector 136) that are connected to other printed circuit boards (e.g., the DDIC and the main printed circuit board 116).

The main printed circuit board 116 includes circuits for performing various functions of the electronic device 100. For example, the main printed circuit board 116 may include a central processing unit (CPU) 124 or a graphics processing unit (GPU). Further, the main printed circuit board 116 may include radio frequency (RF) front end to process wireless signals received via the antenna. The main printed circuit board 116 also includes circuits for processing NFC signals received via the NFC coil in the FPCB 112. In one or more embodiments, the main printed circuit board 116 and the FPCB 112 are couple via one or more fabric over foam gaskets 128. The fabric over foam gaskets 128 may assist conducting of heat from the main printed circuit board 116 as well as prevent interference to the wireless signal received at the main printed circuit board 116 via the antenna.

The shapes of the frame 120, the components installed therein, and their vertical stacking structure of FIG. 1 are merely illustrative. The frame 120 may take various other shapes and may include fewer or more discrete components. Further, the spatial arrangement of the components in the electronic device 100 may be varied. For example, one or more printed circuit board may be placed horizontally in tandem instead of being stacked vertically.

Figure 2:
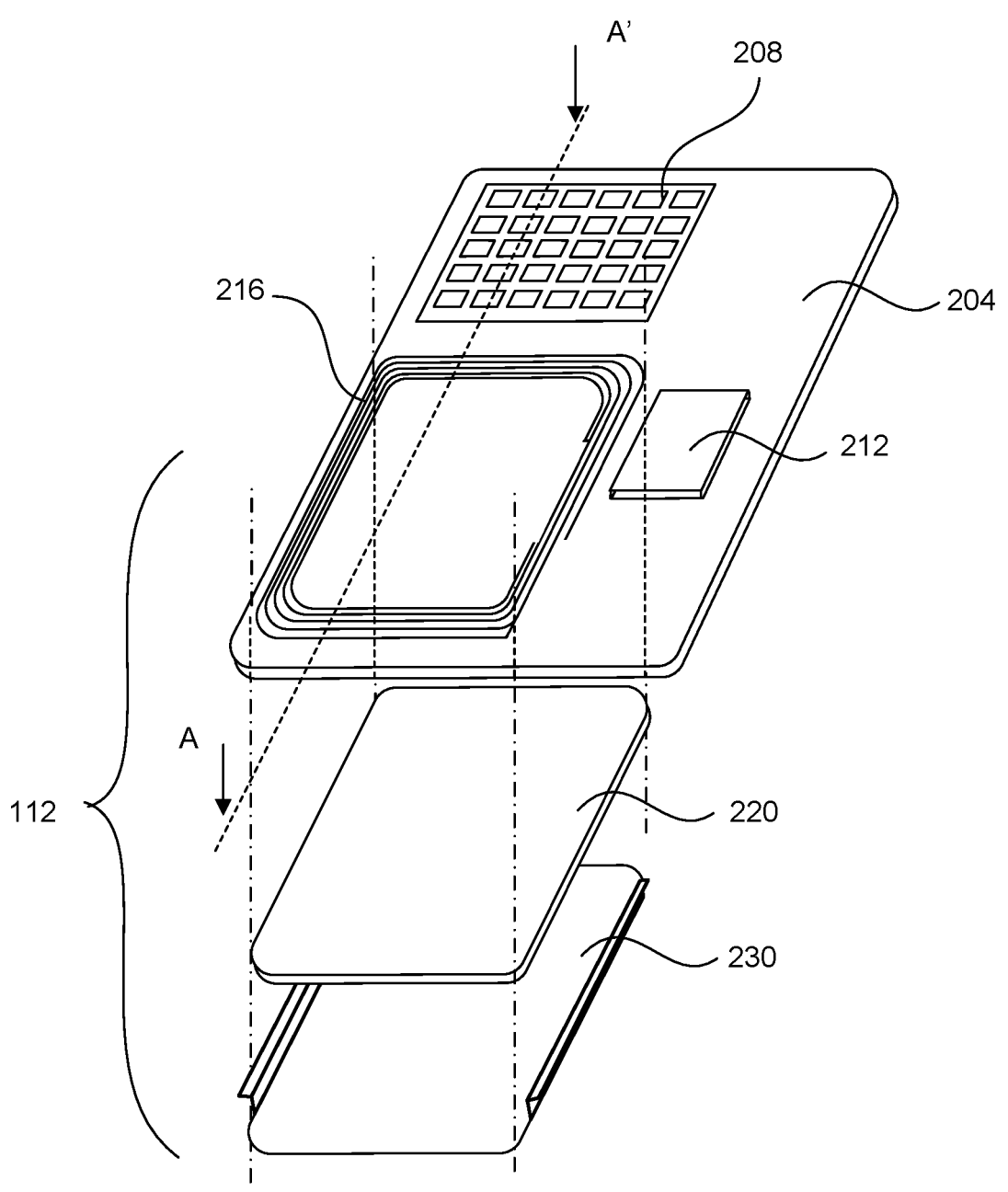
FIG. 2 is an exploded view of a flexible printed circuit board (FPCB), according to some embodiments.

FIG. 2 is an exploded view of the FPCB 112, according to some embodiments. The FPCB 112 may include, among other components, a body 204, a ferrite sheet 220 below a first region 304A, 304B and a conductive layer 230. The body 204 may include an NFC coil 216, circuit components 208 and a socket 212. The socket 212 is connected to the NFC coil 216 and the circuit components 208 via conductive traces (not shown) on the body 204 or inside the body 204. One or more connectors are inserted into the socket 212 to connect the NC coil and the circuit components 208 with circuits in other printed circuit boards (e.g., DDIC or the main printed circuit board 116). The socket 212 may be a ZIF socket.

Figure 3A:
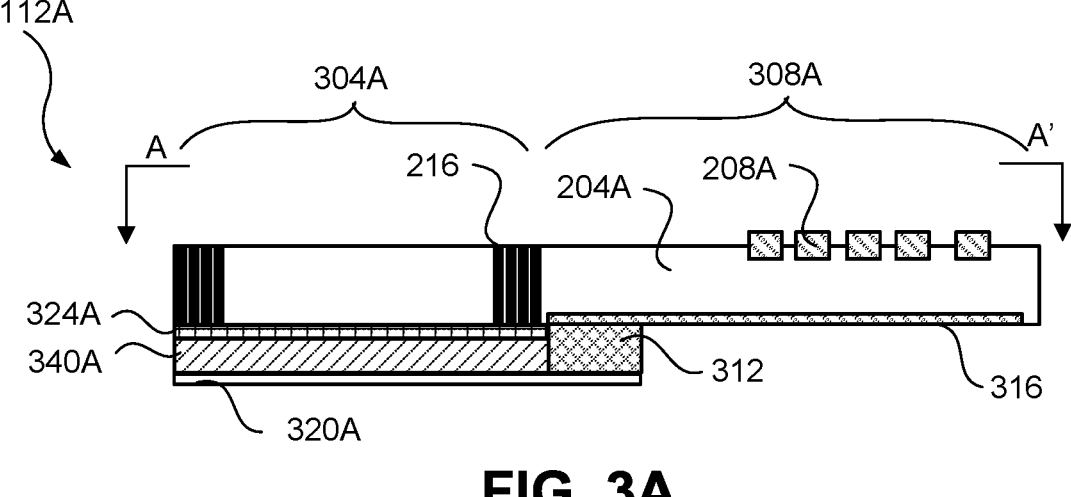
FIG. 3A is a cross-sectional diagram of the FPCB, according to one embodiment.

FIG. 3A is a cross-sectional diagram of the FPCB 112A taken along line A-A' of FIG. 2, according to one embodiment. The body 204A of the FPCB 112A is divided into a first region 304A and a second region 308A. In the first region, the NFC coil 216 is formed in the body 204A. In the second region, the circuit components 208A are formed. The circuit components 208A may be capacitors that operate with the DDIC in the display assembly 108 to operate the display panel. To prevent the circuit components 208 from interfering with the function of the NFC coil 216, the circuit components 208A are provided only in the second region 308A but not in the first region 304A.

Below the first region 304A, a ferrite sheet 340A is provided to enhance the function of the NFC coil 216. By providing the ferrite sheet 340A, part of the NFC communication signals passing through the body 204A of the FPCB 112A is reflected back onto the NFC coil 216. An insulation layer 324A (e.g., polyimide layer) is provide between the NFC coil 216 and the ferrite sheet 340A. In one or more embodiments, the insulation layer 324A may also secure the ferrite sheet 340A onto the bottom side of the body 204A.

Below the second region 308A, a first conductive layer 316 may be formed or provided to ground the FPCB 112A. The first conductive layer 316 may be made of copper. Further, a second conductive layer 320A may be formed or provided below the first region 304A. The second conductive layer 320A may be embodied as a copper sheet. The first conductive layer 316 and the second conductive layer 320A are connected via a conductive bridge 312, which collectively ground the body 204 of the FPCB 112A to prevent interference of signals associated with the antenna in the frame 120 and/or RF circuits in the main printed circuit board 116.

In one or more embodiments, the second conductive layer 320A has an adhesive layer formed on its upper surface so that the second conductive layer 320A can secure itself and the ferrite sheet 340A to the lower surface of the body 204A. The conductive bridge 312 may be embodied, for example, as a fabric over foam gasket.

Figure 3B:
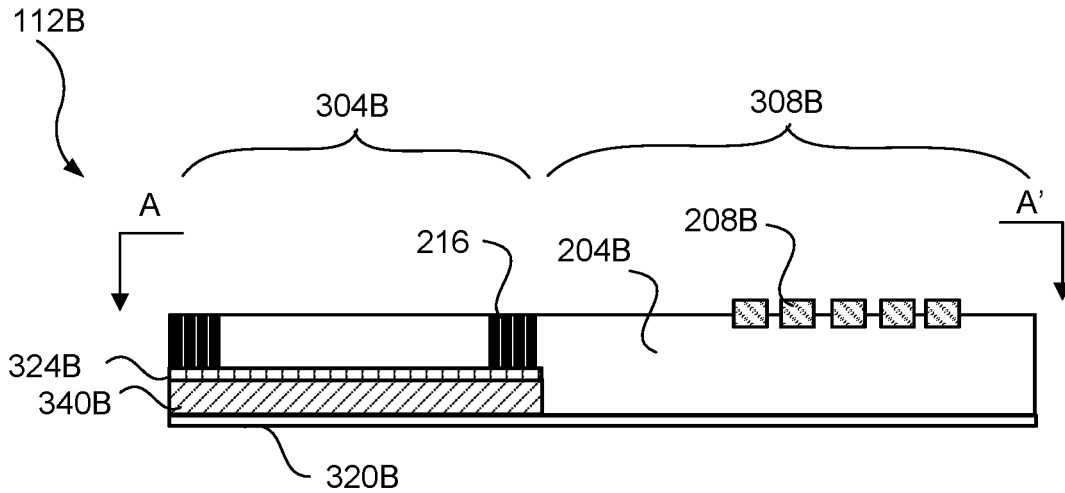
FIG. 3B is a cross-sectional diagram of the FPCB, according to another embodiment.

FIG. 3B is a cross-sectional diagram of the FPCB 112B taken along line A-A' of FIG. 2, according to another embodiment. The FPCB 112B of FIG. 3B is different from the FPCB 112A of FIG. 3A in that body 204B has a different thickness in a first region 304B (where the NFC coil 216 is formed) and a second region 308B (where circuit components 208B are provided), and that no separate first conductive layer 316 and conductive bridge 312 are provided. Instead, a single conductive layer 320B extends across the entire bottom surface of the FPCB 112B to ground the FPCB 112B. An insulation layer 324B (e.g., polyimide layer) is also provided between the NFC coil 216 and the ferrite sheet 340B.

The first region 304B of the body 240B may have fewer layers of conductive traces and polymer layers compared to the second region 308B to vary the thickness. It is advantageous to have the second region 308B thicker than the first region 304B because the overall thickness of the FBCB 112B may be reduced, enabling further reduction of the thickness of the electronic device.

The embodiments described above with reference to FIGS. 3A and 3B are merely illustrative. The FPCB 112 may include more components and regions than what are illustrated in FIGS. 3A and 3B. Further, the FPCB 112 may have shapes other than square. Also, at least a portion of the body 204 may be folded or wrapped.

In one or more embodiments, the ferrite sheet 340 is formed directly on and integrated with the body 204 of the FPCB 112 instead of being formed separately and being attached to the body 204 of the FPCB 112. The ferrite sheet 340 may be integrated onto the body 204 with polyimide layers (PIs) on top or bottom of the ferrite sheet 340 in the same manner as adding conductive layers in the FPCB 112.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A flexible printed circuit board in an electronic device, the flexible printed circuit board comprising:
   a conductive coil in a first region of a body of the flexible printed circuit board, the conductive coil configured to receive or send data via near-field communication (NFC);
   one or more circuit components in a second region of the flexible printed circuit board;
   a ferrite sheet on a side of the flexible printed circuit board opposing a first surface, wherein the ferrite sheet overlaps the first region including the conductive coil; and
   an insulating layer disposed between the conductive coil and the ferrite sheet, the insulating layer being positioned adjacent a conductive bridge such that the insulating layer contacts at least a portion of the conductive bridge, the insulating layer configured to secure the ferrite sheet to a portion of the body of the flexible printed circuit board.

2. The flexible printed circuit board of claim 1, wherein the one or more circuit components are electrically connected to a display circuit board for operating a display panel.

3. The flexible printed circuit board of claim 2, wherein the one or more circuit components comprise capacitors in the second region.

4. The flexible printed circuit board of claim 1, further comprising a first conductive layer extending at least under the ferrite sheet.

5. The flexible printed circuit board of claim 4, wherein the first conductive layer comprises a copper film.

6. The flexible printed circuit board of claim 5, further comprising an adhesive layer between the copper film to secure the copper film to the first region.

7. The flexible printed circuit board of claim 4, further comprising a second conductive layer below the second region, and a conductive bridge between the first conductive layer and the second conductive layer.

8. The flexible printed circuit board of claim 1, further comprising a socket configured to receive a connector to another printed circuit board, the socket connected to at least one of the conductive coil or the one or more circuit components.

9. A portable electronic device, comprising: a flexible printed circuit board comprising:
   a conductive coil in a first region of a body of the flexible printed circuit board, the conductive coil configured to receive or send data via near-field communication (NFC), one or more circuit components in a second region of the flexible printed circuit board;
   a ferrite sheet on a side of the flexible printed circuit board opposing a first surface, wherein the ferrite sheet overlaps the first region including the conductive coil; and
   an insulating layer disposed between the conductive coil and the ferrite sheet, the insulating layer being positioned adjacent a conductive bridge such that the insulating layer contacts at least a portion of the conductive bridge, the insulating layer being configured to secure the ferrite sheet to a portion of the body the flexible printed circuit board;

a first printed circuit board comprising a first circuit coupled to the one or more circuit components to perform a function of the portable electronic device; and
   a second printed circuit board comprising a second circuit coupled to the conductive coil to process a wireless signal received or sent via the conductive coil.

10. The portable electronic device of claim 9, further comprising a display panel that is operated by the first circuit and the one or more circuit components.

11. The portable electronic device of claim 10, wherein the one or more circuit components comprise capacitors in the second region.

12. The portable electronic device of claim 9, wherein the flexible printed circuit board further comprises a first conductive layer extending at least under the ferrite sheet.

13. The portable electronic device of claim 12, wherein the first conductive layer comprises a copper film.

14. The portable electronic device of claim 13, wherein the flexible printed circuit board further comprises an adhesive layer between the copper film to secure the copper film to the first region.

15. The portable electronic device of claim 12, wherein the flexible printed circuit board further comprises a second conductive layer below the second region, and a conductive bridge between the first conductive layer and the second conductive layer.

16. The portable electronic device of claim 12, wherein the flexible printed circuit board further comprises a socket configured to receive a connector to another printed circuit board, the socket connected to at least one of the conductive coil or the one or more circuit components.

17. The portable electronic device of claim 9, further comprising a fabric over foam gasket between the flexible printed circuit board and the second printed circuit board.

18. The flexible printed circuit board of claim 1, wherein the portion of the body corresponds to a bottom side of the body.

19. The portable electronic device of claim 9, wherein the portion of the body corresponds to a bottom side of the body.

* * * * *